May 6, 1930.    C. W. JÁRVIS    1,757,668
RAKE
Filed May 10, 1929
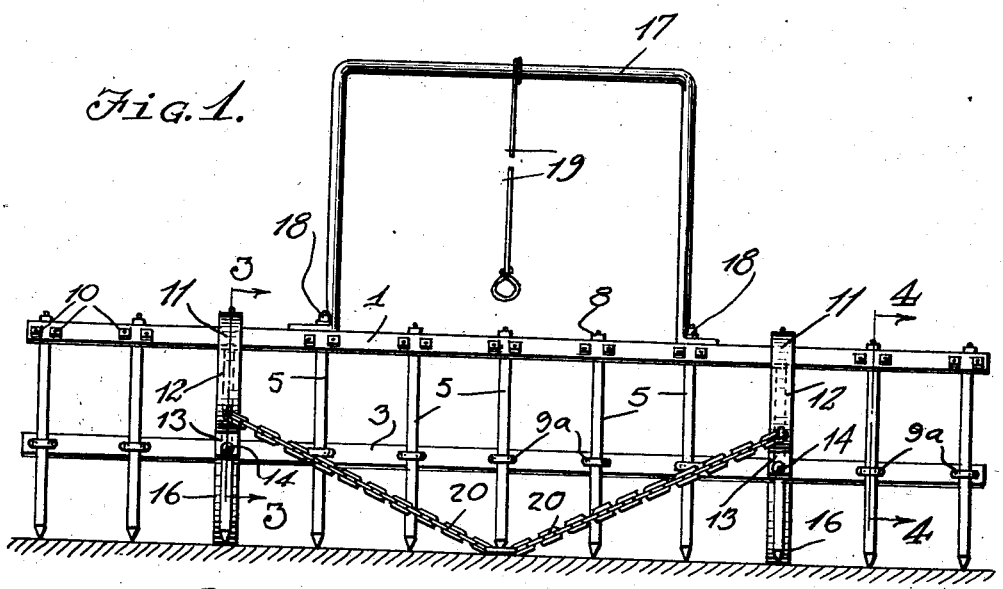
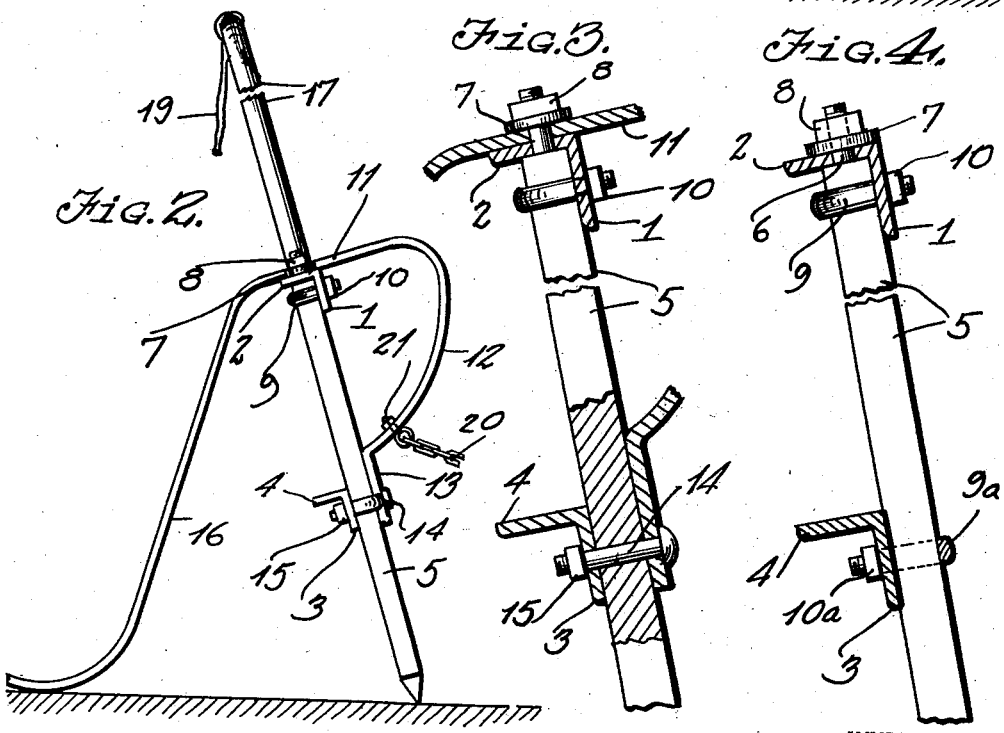
INVENTOR.
C. W. Jarvis
BY
Bryant Lowry
ATTORNEYS.

Patented May 6, 1930

1,757,668

UNITED STATES PATENT OFFICE

CHARLES W. JARVIS, OF COURTLAND, CALIFORNIA

RAKE

Application filed May 10, 1929. Serial No. 362,001.

This invention relates to certain new and useful improvements in rakes and particularly to rakes of the horse drawn type especially designed for orchard use in gathering and removing tree branches and the like, together with other refuse found upon the ground after tree pruning an has for its primary object to provide a rake structure embodying great durability in strength, extremely simple in construction and inexpensive to manufacture.

A further object of the invention is to provide a rake of the above type supported in a vertically inclined position by rearwardly disposed skids that constitute pivot points or supports to permit elevation of the rake teeth in escaping tree roots or other obstructions.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a front elevational view of a horse drawn rake constructed in accordance with the present invention;

Figure 2 is an end elevational view of the same showing the rake teeth and frame vertically supported in an inclined position by the rear skids;

Figure 3 is a cross-sectional view taken on line 3—3 of Figure 1 showing the skid attached to the brake frame; and Figure 4 is a cross-sectional view taken on line 4—4 of Figure 1, showing one of the rake teeth secured to the frame.

Referring more in detail to the accompanying drawing, there is illustrated a rake comprising a horizontal head bar formed of angle iron with a front section 1 and an angle top section 2, a rake tooth supporting bar being also provided and comprising an angle iron having a front section 3 and an angular top section 4.

Each rake tooth 5 carries a reduced threaded pin 6 at its upper end that extends through an opening in the top section 2 of the head bar, the rake tooth 5 being positioned rearwardly of the front section 1 of the head bar. The threaded pin extension upon the upper end of the rake tooth extending through the top section 2 of the head bar receives a washer 7 and a retaining nut 8. A U-shaped bolt 9 incloses the rake tooth 5 at the rear side of the front section 1 of the head bar with the threaded ends thereof projecting through the front section 1 to receive retaining nuts 10. The rake tooth 5 is positioned forwardly of the front section 3 of the supporting bar and is enclosed by a U-shaped bolt 9ª having its threaded ends passed through the front section 3 of the supporting bar to receive retaining nuts 10ª. The rake teeth 5 are equidistantly spaced as illustrated in Figure 1 and are disposed over the entire length of the head and supporting bars.

A pair of rearwardly disposed skids is carried by the rake frame, one adjacent each end thereof, each skid comprising a strap iron having an upper section 11 apertured for mounting upon one of the pins 6 of a rake tooth as shown in Figures 1 and 2 and retained thereon by the washer and nut 7 and 8 respectively, the sections 11 of the skids engaging the upper angle section 2 of the head bar. The forward end of the skid section 11 is downwardly curved and rearwardly directed as at 12 to a terminal end 13 that is apertured for the passage of a headed screw bolt 14 that passes through an opening in the associated rake tooth 5 and front section 3 of the supporting bar to receive a retaining nut 15 upon the rearwardly projecting threaded end thereof. The rear end of the strap section 11 carries a downwardly directed skid 16 angularly disposed for ground engagement as shown in Figure 2 for supporting the rake structure in the vertically inclined position illustrated. A U-shaped handle frame 17 is disposed centrally of the head bar of the rake and is attached at its ends to said head bar as at 18, while a pull cord or cable 19 is secured to the handle bar 17 as shown in Figure 1. Draft chains 20 are attached as at 21 to the lower ends of the forward sections 12 of the strap iron skids, the rake being horse drawn or otherwise propelled.

Should an obstruction be encountered in the forward movement of the rake, the rake teeth 5 may be elevated with the skids 16 functioning as pivots and such elevating movement may be accomplished either by directly engaging the handle bar 17 or pulling on the rope or cable 19. The rake structure has been found most practical for use in orchards after the trees have been pruned in gathering and removing tree branches and other refuse, although the same may be employed in any connection where a rake is used. The rake teeth are securely anchored to the head and supporting bars of the rake frame, as are also the skids resulting in a strong and substantial construction.

While there is herein shown and described the preferred embodiment of the present invention it is nevertheless to be understood that minor changes may be made therein without departing from the spirit and scope of the invention as claimed.

I claim:—

1. A rake of the character described, comprising a frame having a head bar and a supporting bar, rake teeth anchored to the two bars, skid irons carried by the two bars, a handle frame to effect tilting of the rake on the skids carried by the head bar, the connection between the rake teeth and bars including a threaded pin extension on each tooth passed through the head bar to receive a retaining nut, and anchor bolts securing the rake teeth to the two bars.

2. A rake of the character described, comprising a frame having a head bar and a supporting bar, rake teeth anchored to the two bars, skid irons carried by the two bars, a handle frame to effect tilting of the rake on the skids carried by the head bar, each skid iron comprising a rearwardly disposed foot, an intermediate portion anchored to the head bar, and a forwardly directed end anchored to the supporting bar.

3. A rake of the character described, comprising a frame having a head bar and a supporting bar, rake teeth anchored to the two bars, skid irons carried by the two bars, a handle frame to effect tilting of the rake on the skids carried by the head bar, the connection between the rake teeth and bars including a threaded pin extension on each tooth passed through the head bar to receive a retaining nut, anchor bolts securing the rake teeth to the two bars, each skid iron comprising a rearwardly disposed foot, an intermediate portion anchored to the head bar, and a forwardly directed end anchored to the supporting bar.

4. A rake of the character described, comprising a frame having a head bar and a supporting bar, rake teeth anchored to the two bars, skid irons carried by the two bars, a handle frame to effect tilting of the rake on the skids carried by the head bar, each skid iron comprising a rearwardly disposed foot, an intermediate portion anchored to the head bar, a forwardly directed end anchored to the supporting bar, and draft means attached to the forward portions of the skids.

5. A rake of the character described, comprising a frame having a head bar and a supporting bar, rake teeth anchored to the two bars, skid irons carried by the two bars, a handle frame to effect tilting of the rake on the skids carried by the head bar, the connection between the rake teeth and bars including a threaded pin extension on each tooth passed through the head bar to receive a retaining nut, anchor bolts securing the rake teeth to the two bars, each skid iron comprising a rearwardly disposed foot, an intermediate portion anchored to the head bar, a forwardly directed end anchored to the supporting bar, and draft means attached to the forward portions of the skids.

In testimony whereof I affix my signature.

CHARLES W. JARVIS.